No. 622,584. Patented Apr. 4, 1899.
W. T. YOUNG.
APPARATUS FOR SEPARATING SKIN FROM EDIBLE PARTS OF FRUITS AND VEGETABLES.
(Application filed June 10, 1898.)
(No Model.) 2 Sheets—Sheet 1.
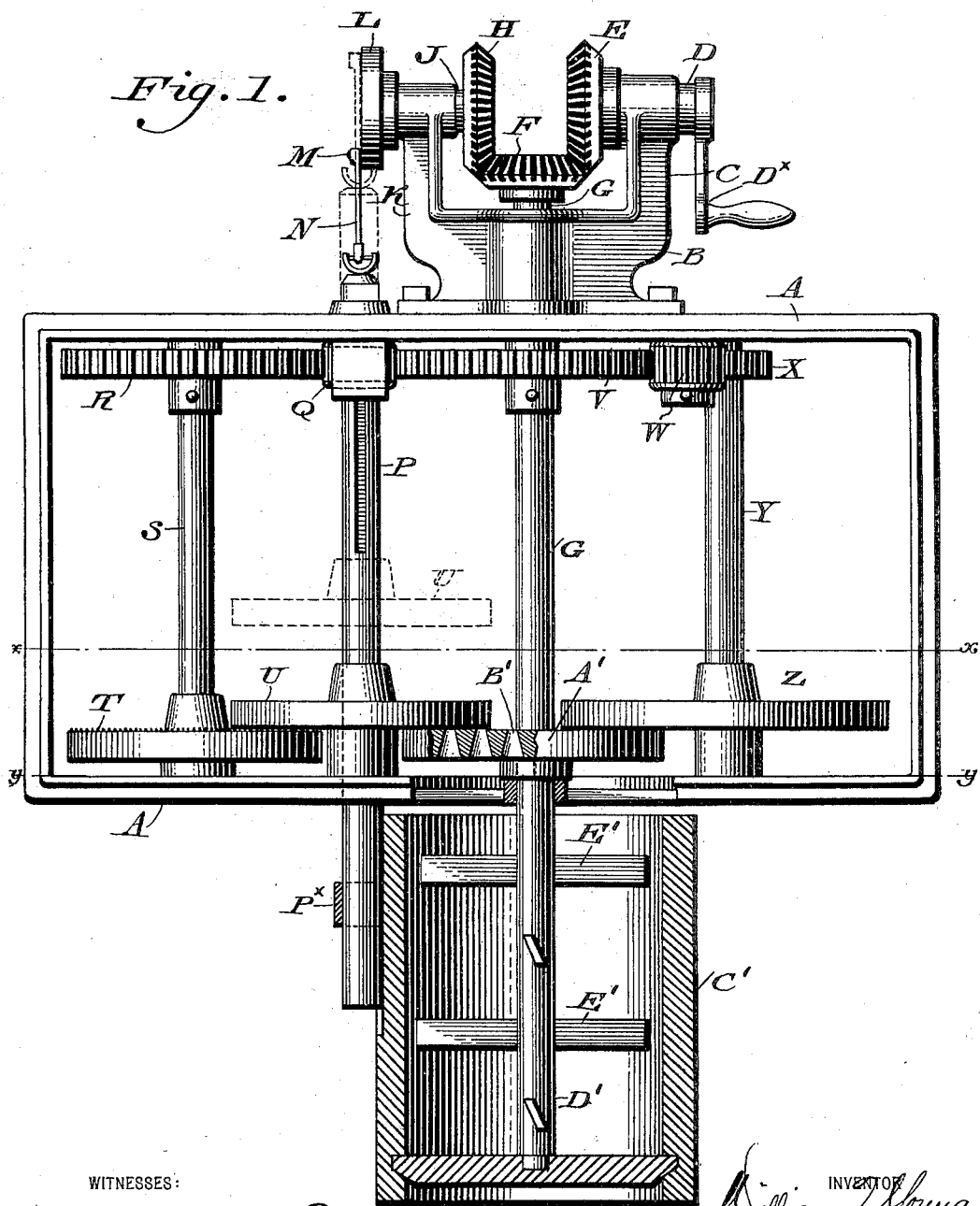

No. 622,584. Patented Apr. 4, 1899.
W. T. YOUNG.
APPARATUS FOR SEPARATING SKIN FROM EDIBLE PARTS OF FRUITS AND VEGETABLES.
(Application filed June 10, 1898.)
(No Model.) 2 Sheets—Sheet 2.
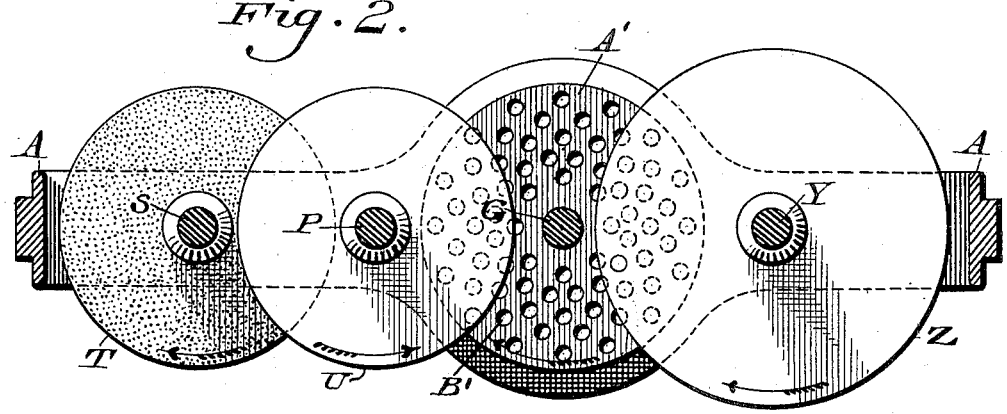
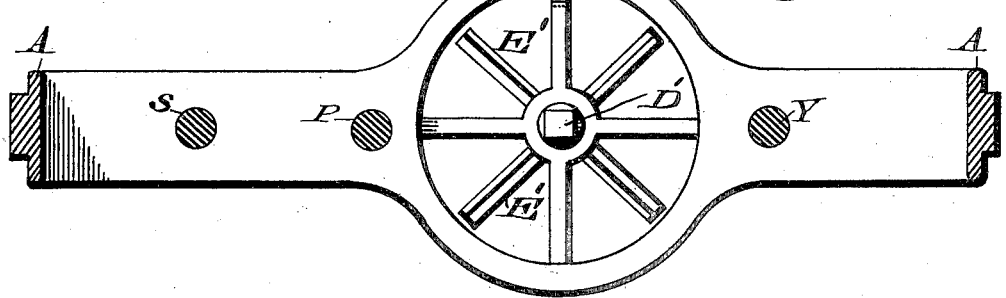
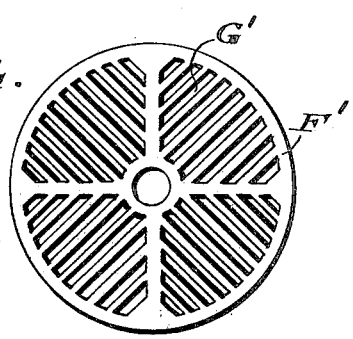
WITNESSES:
INVENTOR
William T. Young.
BY
Diedersheim & Fairbanks.
ATTORNEYS.

UNITED STATES PATENT OFFICE.

WILLIAM T. YOUNG, OF VINELAND, NEW JERSEY.

APPARATUS FOR SEPARATING SKIN FROM EDIBLE PARTS OF FRUITS AND VEGETABLES.

SPECIFICATION forming part of Letters Patent No. 622,584, dated April 4, 1899.

Application filed June 10, 1898. Serial No. 683,072. (No model.)

*To all whom it may concern:*

Be it known that I, WILLIAM T. YOUNG, a citizen of the United States, residing at Vineland, in the county of Cumberland, State of New Jersey, have invented a new and useful Improvement in Apparatus for Separating the Skin from the Edible Part or Pulp of Fruits and Vegetables, which improvement is fully set forth in the following specification and accompanying drawings.

My invention consists of an improved construction of apparatus for separating the edible portion of fruits and vegetables from the skin thereof with great rapidity and effectiveness, provision being made for keeping the apparatus in perfect operative condition at all times and means being also provided for enabling the attendant to add the necessary seasoning to the prepared vegetable before the same leaves the machine.

It further consists of novel details of construction, all as will be hereinafter fully set forth, and specifically pointed out in the claims that follow the specification.

Figure 1 represents a side elevation, partly in section, of an improved apparatus for separating the skin from the edible part or pulp of fruits and vegetables. Fig. 2 represents a section on line $x\ x$, Fig. 1. Fig. 3 represents a section on line $y\ y$, Fig. 1. Fig. 4 represents a modified form of disk, to be hereinafter referred to.

A designates the housing of the machine, upon which is supported the frame B, which is provided with an arm C, in the upper portion of which the shaft D is journaled, said shaft carrying a suitable crank-arm $D^\times$ and also the beveled gear E, which meshes with a beveled pinion F, mounted upon the upright shaft G, which revolves in suitable bearings.

H designates a beveled gear in mesh with the pinion F, said gear H being mounted upon the shaft J, which revolves in suitable bearings in the arm K of the frame B, said shaft carrying a disk or plate L, which has a crank-pin M, the latter having one end of a rod N attached thereto, the lower end of said rod having a connection to the shaft P, which latter is splined to the pinion Q, which meshes with the gear R, which is mounted upon the shaft S, which latter has suitable bearings in the upper and lower portions of the housing A. The lower portion of the shaft S carries a disk having its upper surface roughened, so as to form the scraper T, which latter revolves underneath the mashing plate or disk U, which is attached to the shaft P, it being understood that said disk U rises and falls with the shaft P, as will be hereinafter explained, said shaft having suitable bearings and being guided at its lower portion in the lug $P^\times$.

V designates a gear attached to the upper portion of the shaft G and in mesh with the pinion Q, said gear being also in mesh with an idler W, which latter revolves in suitable bearings and is in mesh with and rotates the pinion X, mounted on the shaft Y, the latter having suitable bearings and carrying upon its lower portion a scraping-disk Z, which latter, similarly to the disk U, is located above the disk A', which is mounted on the shaft G, said disk A' having the openings B' therethrough, which latter are preferably tapered.

C' designates a receptacle located below the framework or housing A and having the lower portion D' of the shaft G projecting thereinto and provided with a suitable bearing, said shaft having the wings or arms E' mounted thereupon, by means of which the mashing or seasoning of the fruits or vegetables is effectively completed.

In Fig. 4 I have shown a modified construction of the disk A', the disk F' (seen in Fig. 4) being made in the form of a grating having the slots G' disposed at an angle to each other.

The operation is as follows: The rotation of the crank D' will by reason of the intermediate gearing cause the disks or plates T, U, A', and Z to revolve in the direction of the arrows seen in Fig. 2, and it will furthermore be evident that the mashing-disk U has a reciprocating as well as rotary movement, said reciprocating movement being caused by reason of the connection to the crank-disk L, it being understood that such connection is made so that the reciprocating and rotary movements of the shaft P take place simultaneously. When it is desired to mash or prepare potatoes or similar vegetables for the table, the same, having been first cooked or softened, are cut in two and the vegetable or edible is fed by hand and placed on the perforated disk with the cut side in contact therewith, it being understood that said vegetable is placed in proximity to the mashing-disk U when the latter is in raised position, and as the rotation of the crank D<sup>×</sup> is continued the vegetable will be mashed upon the disk A' upon the descent of the disk U and the pulp or edible portion thereof forced through the perforations B' into the receptacle C'. The disk T will effectively scrape the under side of the disk U, while the surface of the perforated plate or disk A' will be effectively scraped by the disk Z, so that the parts will at all times be kept in perfect operative condition. The edible portion of the article being prepared, after passing through the openings in the plate or disk A' or F', falls into the receptacle C', where it is thoroughly mashed and commingled, the seasoning being readily effected therein, while the skin or pericarp which remains on the disk A' is readily removed therefrom, as is evident.

It will thus be apparent from the foregoing that by my invention a cheap and effective machine is produced in which the edible portion of fruits and vegetables can be readily separated from the skin, the articles leaving the machine ready for the table, as is evident.

In the preferred embodiment of my invention it may be necessary to make provision for enabling the disk T to have an up-and-down or reciprocating movement in unison with the disk U, whereby the cleaning of the under side of the latter may be more effectively accomplished.

Having thus described my invention, what I claim as new, and desire to secure by Letters Patent, is—

1. In a machine of the character named, the combination of a rotary apertured disk or plate, a plurality of disks or plates overlapping the first-mentioned disk or plate, one of said last-mentioned disks or plates reciprocating relative to said apertured disk or plate, a scraping device for said reciprocating disk or plate, and means for actuating the latter.

2. In a machine of the character named, the combination of a rotary apertured disk or plate, a scraping-disk therefor, means for rotating said disk, a mashing device or bumper consisting of a rotatable disk overlapping said rotary apertured disk or plate and adapted to have also a reciprocating movement, and a scraping device for said mashing-disk, in combination with means for actuating said disks or plates.

3. In a machine of the character named, an upright shaft, a suitable housing in which said shaft is mounted, a gear secured to said shaft, an idler and a pinion meshing with said gear, a shaft splined to said pinion and adapted to have a rotary and reciprocating movement, a second gear in mesh with said pinion and mounted on a shaft provided with a scraping-disk having a roughened surface, a mashing-disk carried by the shaft splined to said pinion, an apertured disk carried by the first-mentioned shaft and adapted to receive the vegetable being treated, a pinion meshing with said idler, a shaft on which said pinion is mounted, and a disk or plate carried by said shaft.

WILLIAM T. YOUNG.

Witnesses:
JOHN A. WIEDERSHEIM,
WM. C. WIEDERSHEIM.